Jan. 7, 1936.  F. E. STAHL ET AL  2,027,003
STRAP FASTENER FOR TIRE CHAINS
Filed March 2, 1932
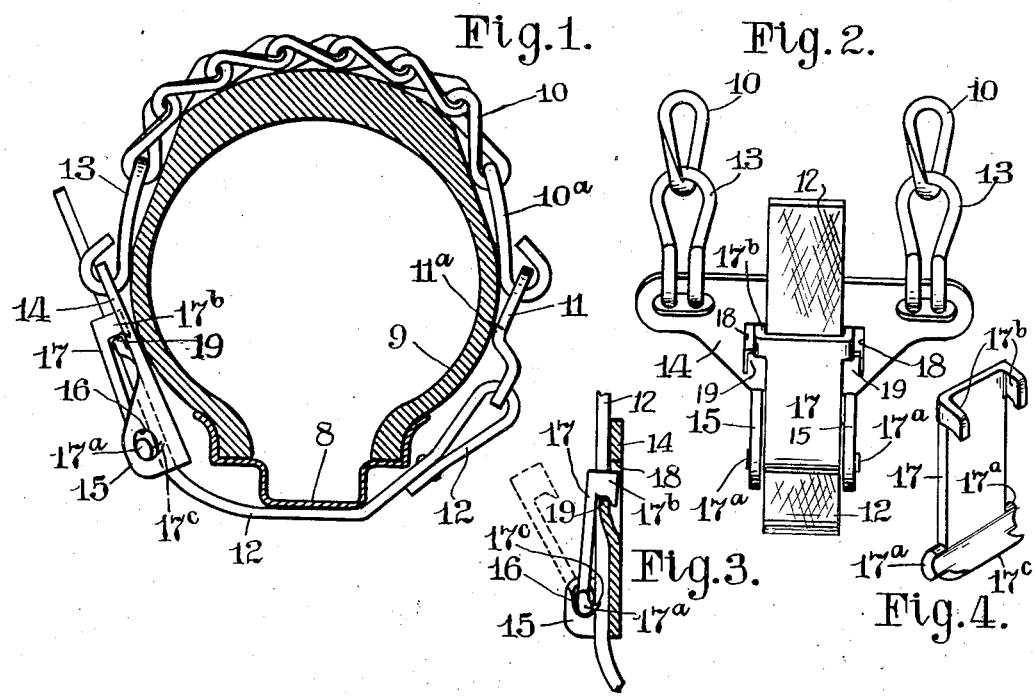
Inventor
FRANK E. STAHL
RAYMOND W. WATERSTRAT Patented Jan. 7, 1936

2,027,003

UNITED STATES PATENT OFFICE 2,027,003

STRAP FASTENER FOR TIRE CHAINS

Frank E. Stahl and Raymond W. Waterstrat, Tonawanda, N. Y., assignors to Columbus McKinnon Chain Corporation, Tonawanda, N. Y., a corporation of New York Application March 2, 1932, Serial No. 596,316

3 Claims. (Cl. 24—191)

This invention relates to a strap fastener especially useful in emergency chains for vehicle tires and has for its object, generally, an improved and simplified construction whereby the fastener may be economically manufactured and the strap firmly secured and easily and quickly applied or removed. A particular object of our invention is an improved construction of locking device for the strap clamping means of an emergency antiskid chain, whereby a pull on the strap in one direction locks the clamping means against accidental release and a pull in the opposite direction unlocks the clamping means. Other objects will appear from the disclosure.

The invention is embodied on the example herein shown and described, the features of novelty being finally claimed.

In the accompanying drawing:

Fig. 1 shows a cross-sectional view of a tire with our device applied thereto.

Fig. 2 is a front view of our strap fastener.

Fig. 3 is a fragmentary, sectional, side view of our invention showing the locking means thereof.

Fig. 4 is a perspective of the clamping device of our invention.

In the drawing, the felloe of the wheel to which our tire is attached is designated at 8, and 9 represents the usual tire casing. Our invention is shown applied to an emergency anti-skid device of the type in which two cross chains 10 are employed, each of which is formed at one end with a hook member 10a and at the opposite end with a hook member 13.

The cross chains, as is customary, are attached at one end by means of the hooks 10a to a plate 11, shown in Fig. 1, which is T-shaped. This plate is bent and offset at its lower portion to form a point 11a to bear against the tire. The strap 12 of the device is adapted to permanently secure it to the plate 11 by having its free end passed through an opening in the plate, doubled back upon itself, and secured to itself preferably by riveting.

At the opposite end of the cross chains 10 is provided another T-shaped plate 14 which carries the clamping device for the strap 12 and in which our invention is embodied. This plate is secured to the chains by means of hooks 13 which pass through suitable slots (see Fig. 2) formed in the plate. The slots are, of course, provided at the chain end of the plate, and the opposite centrally arranged end of the plate is provided with two parallel wings 15 which are formed preferably from the metal of the plate and are bent upwardly at right angles to the top surface thereof. These wings are arranged at the end of the device which first receives the strap, and each of them is provided with elongated openings or bearings 16 which are arranged substantially parallel to the surface of the plate. A strap lever 17 is arranged between the wings 15 and is provided with trunnions 17a which engage with the elongated bearings 16 of the wings, whereby the lever is pivotally mounted and slidable in said bearings. The lever is provided across its width with a claw or gripping edge 17c which is arranged at the end where the trunnions 17a are provided. The lever, therefore, swings backwardly away from the end where the strap is first inserted when being brought to its locked position. The free end of the lever is formed with two downwardly extending hooks 17b. These hooks are preferably arranged in parallel relation and are so positioned as to straddle the strap 12 when it is threaded through the fastening means.

The plate 14 is provided with apertures 18 at points immediately beneath the hooks 17 of the lever when in its clamping position. At one side of each of the apertures is provided a keeper 19 which is formed by slitting the metal and bending the same upwardly so as to bring the free end of the keeper above the level of the top surface of the plate, as shown in Fig. 3. These keepers are so formed that their free ends project away from the end which first receives the strap so that they will engage with the hooks 17b of the lever when the same is moved longitudinally, as hereinafter described.

When our strap fastener is to be put into use, the free end of the strap 12 is inserted between the wings 15 and under the lever 17, while the lever is turned out to an inoperative position such as that shown by the dotted lines in Fig. 3. When in this position with the strap in contact with the plate 14, the strap is pulled through the fastener until the cross chains are drawn against the tire with the desired tightness, and then the free end of the lever 17 is pressed down toward the plate until the hooks 17b thereof enter the openings 18 where they will be in position to engage with the keepers 19. In pressing the lever to its locking position, the claw or gripping edge 17c thereof will engage the strap and this movement will tend to carry the trunnions 17a to those ends of the elongated bearings 16 which are nearer the keepers and openings 18. When the device is placed in service, the pull on the cross chains will cause longitudinal movement of the strap and lever in a direction which is toward the end of the plate through which the strap is first passed. The hooks 17b being already in engagement with the openings 18, such movement will cause the hooks 17b to become engaged with the free ends of the keepers 19 and thus lock the lever in its clamping position. It is obvious that since the elongated bearings are substantially parallel with the plate, the pressure of the lever gripping edge upon the strap will remain substantially uniform throughout such longitudinal movement.

To disengage the clamping member from the strap, it is only necessary to pull the strap in the same direction in which it is moved when being received in the device and to then pull it outwardly away from the device so as to move the lever upon its trunnions and thereby disengage the claw or gripping edge 17a from the strap. The strap is now released and can be withdrawn entirely from engagement with the plate.

Obviously, some modifications of the details herein shown and described may be made without departing from the spirit of our invention or the scope of the appended claims, the form shown being merely a preferred embodiment thereof.

Having thus described our invention, what we claim is:

1. A fastener for a strap comprising a supporting plate, spaced wings carried by the plate, each wing being formed with an elongated bearing adjacent the end of the plate which receives the strap, a lever extending between said wings and having trunnions slidable in the elongated bearings to permit longitudinal movement of the lever in clamped position, said lever being provided between the trunnions with a claw for clamping the strap, keepers formed in the body of the plate independently of the wings, and hooks formed on the free end of the lever, said hooks being drawn into engagement with the keeper when the lever is in its clamped position by longitudinal movement of the strap in the opposite direction from that in which it is received due to the tension of the strap on the claw.

2. A fastener for a strap comprising a supporting plate, spaced wings carried by the plate, each wing being formed with an elongated bearing adjacent the end of the plate which receives the strap, said bearings being substantially parallel with the plate, a lever extending between said wings and having trunnions slidable in the elongated bearings to permit longitudinal movement of the lever in clamped position, said lever being provided between the trunnions with a claw for clamping the strap, keepers formed in the body of the plate independently of the wings, and hooks formed on the free end of the lever, said hooks being drawn into engagement with the keeper when the lever is in its clamped position by longitudinal movement of the strap in the opposite direction from that in which it is received due to the tension of the strap on the claw.

3. A fastener for a strap comprising a supporting plate, spaced wings carried by the plate, each wing being formed with an elongated bearing adjacent the end of the plate which receives the strap, said bearings being substantially parallel with the plate, a lever extending between the wings and having trunnions slidable in the elongated bearings to permit longitudinal movement of the lever in clamped position, a claw running substantially across the lever between the trunnions for clamping the strap, keepers formed in the body of the plate independently of the wings and on opposite sides of the free end of the strap when the strap is in position, and hooks formed on the free end of the lever, said hooks being drawn into engagement with the keeper when the lever is in its clamped position by longitudinal movement of the strap in the opposite direction from that in which it is received due to the tension of the strap on the claw.

FRANK E. STAHL.
RAYMOND W. WATERSTRAT.